Patented Jan. 11, 1938

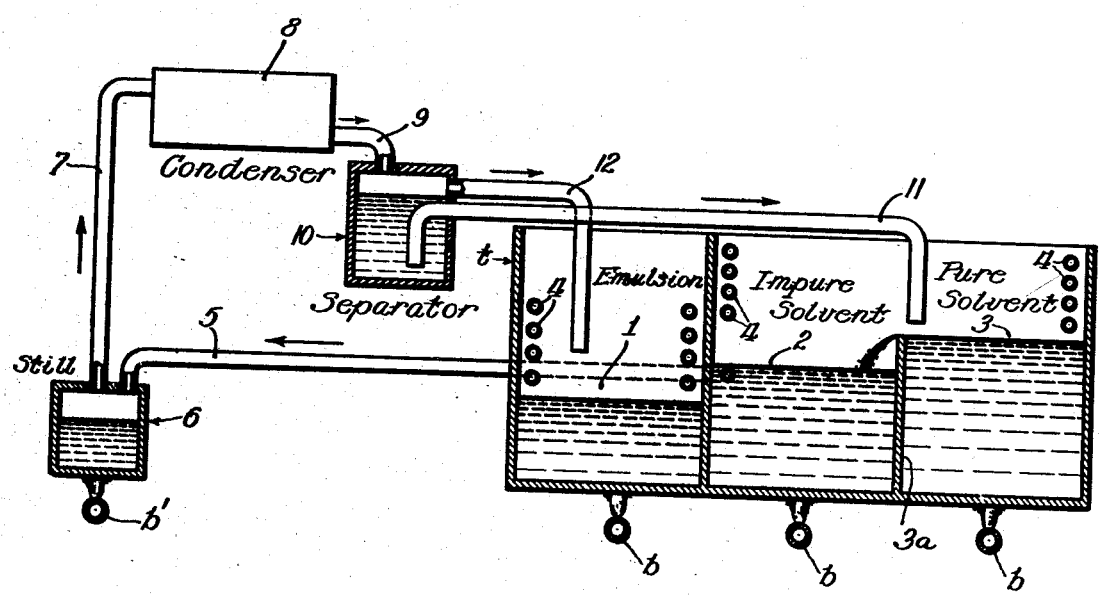

2,104,992

UNITED STATES PATENT OFFICE 2,104,992

MACHINE FOR CLEANING AND DEGREASING ARTICLES

Hanns Höllerer, Munich, Germany, assignor to Dr. Alexander Wacker Gesellschaft fur Elektrochemische Industrie, G. m. b. H., Munich, Bavaria, Germany Original application April 22, 1935, Serial No. 17,572, which in turn is a division of Serial No. 744,393, September 17, 1934. Divided and this application June 22, 1936, Serial No. 86,578. In Germany October 20, 1933

2 Claims. (Cl. 87—6)

This invention relates to machines for degreasing and cleaning of various articles, particularly metal articles.

It is known to degrease articles by subjecting them to the action of a suitable solvent, such as a chlorinated hydrocarbon, trichlorethylene being commonly used, in either liquid or vapor form. While this method of degreasing has proven highly satisfactory in many respects, it has been found that, in many instances, small particles of emery, grit, bloom and other foreign materials adhere to the degreased articles and must be removed therefrom, usually by hand, after the degreasing operation. This involves delay and additional work, with corresponding increase in cost of production.

The primary object of my invention is to avoid the above noted objections to the present practice by providing a simple and inexpensive machine for effectively cleaning and degreasing the articles being treated, in a single operation.

Further objects and advantages of my invention will appear from the detail description.

The drawing is a semi-diagrammatic lengthwise vertical sectional view of a machine embodying my invention, certain parts being shown in elevation.

This application is a division of my copending application, Serial No. 17,572, filed April 22, 1935, for Machine for cleaning, which is a division of my copending application, Serial No. 744,393, for Process of cleaning, filed September 17, 1934.

I have found that by treating the articles to the action of a suitable emulsion, as a step in the cleaning process, all particles of foreign materials are effectively removed therefrom. The emulsion used may be one of chlorinated hydrocarbons and water, to which may be added well known emulsions of fat or oil, acids and alkalies and their derivatives, as products of sulphonizing processes, such as are used in the textile industry. I can also prepare a suitable emulsion in the following manner,—by mixing a component part of a known emulsion, as above, with water and a solvent, such as trichlorethylene, and adding as another component some of the hydrocarbon groups or similar combinations, such as, for example, trioxytriethylamin. It is advantageous to add to the emulsion an ingredient which will assist in cleaning the articles and will also increase the stability of the emulsion. I find that various substances are suitable for this purpose, including phenols, aliphatic bases, dibutylamin, aromatic bases, as anilin, pyridin, etc. The addition to the emulsion of relatively small amounts, such as ½% to 1% of any of these substances produces satisfactory results.

The emulsion used may vary within wide limits, depending upon the solvent used, the nature of the articles being cleaned, etc. In cleaning metal articles covered with oil or polishing pastes, an emulsion formed of the following ingredients in substantially the proportions stated, by volume, gives satisfactory results:—25% to 30% of trichlorethylene, 1% to 2% of any of the emulsions used in the textile industry, above referred to, ½% to 1% of any of the above stabilizers, and about 70% water.

In practicing my process, the emulsion is preferably heated to a moderately high temperature, depending somewhat on the nature and condition of the articles. The articles are then subjected to the action of the emulsion, conveniently by immersion therein, after which they are subjected to the action of the solvent, in either liquid or vapor form, and then are dried. This leaves the articles in a completely degreased and bright and clean condition, free of all particles of foreign materials such as would not be completely removed from the articles by treating them to the action of the solvent alone, in accordance with present practice.

If desired, the articles may be subjected to the action of the solvent preliminary to immersion in the emulsion, though ordinarily this is not necessary. It will be obvious that a certain amount of the emulsion will adhere to the articles and will tend to contaminate or dilute the solvent to the action of which the articles are subsequently subjected. I provide, in the machine for carrying out my process, means for obviating this difficulty and also preferably provide means for assuring pure solvent to the action of which the articles are subjected as the final step in the cleaning operation.

The machine comprises a tank $t$, conveniently formed of sheet metal, the interior of which is divided into three compartments 1, 2 and 3. This machine is intended for use with a volatile solvent having a specific gravity higher than that of water. Trichlorethylene has proven satisfactory. Suitable heating devices, in the form of burners $b$ are disposed beneath the respective compartments. Cooling coils 4 are disposed within compartment 1, at each end thereof and above the normal liquid level therein, similar coils 4 being disposed at the inner end of compartment 2 and the outer end of compartment 3, it being noted that partition 3a between compartments 2 and 3 is low relative to the end walls of the tank and the partition between compartments 1 and 2.

Compartment 1 contains the emulsion, compartment 2 contains the liquid solvent which may be contaminated by a relatively small amount of emulsion, and compartment 3 contains pure solvent, such as trichlorethylene, the normal level of the liquid in the respective compartments being substantially that shown. The liquids are heated to proper operating temperatures by the burners $b$, and the cooling coils 4 produce cooling zones above the bodies of liquids effective for condensing the solvent vapors and thereby preventing escape thereof to atmosphere, as is known in the art.

A pipe 5 connects compartment 2, a slight distance below the normal liquid level therein, to the top of a still 6 disposed adjacent one end of tank $t$ and heated by a burner $b'$. A take-off pipe 7 extends from the top of still 6 to the inlet of a condenser 8, of known type, the condensate from which is delivered by pipe 9 to a separator 10. The liquid solvent is delivered from the lower portion of separator 10, by a pipe 11, into compartment 3, and emulsion and water are delivered from the top of separator 10, by a pipe 12, into compartment 1.

The articles being treated are immersed in the emulsion in compartment 1, are then immersed in the solvent in compartment 2, which solvent may be contaminated by emulsion remaining on the articles, and are finally immersed in pure solvent in compartment 3. Upon withdrawal of the articles from the solvent in compartment 3, they may be suspended for a short time above the liquid in this compartment, in the zone of the cooling coils 4, where the articles quickly dry. In this manner the articles are effectively degreased and cleaned and leave the machine in a bright and dry condition and free of all particles of foreign materials.

The emulsion carried over from compartment 1 into compartment 2 by the articles being treated, rises to the top of the liquid solvent in the latter compartment and flows, together with some of the solvent, through pipe 5, into still 6. The vapors from still 6 flow through pipe 7 into condenser 8, the condensate being discharged into separator 10, from which the liquid solvent is delivered to compartment 3, the emulsion and water being delivered to compartment 1. The excess pure liquid solvent flows from compartment 3 over partition $3a$ into compartment 2, from which latter compartment excess solvent and any emulsion therein are delivered to still 6 by pipe 5. This effectively prevents the accumulation of any emulsion in compartment 3, assuring that the articles are immersed in pure solvent in the final step of the cleaning operation, while also assuring continuous circulation and distillation of the solvent.

While I have disclosed, by way of example, the preferred form of my invention, changes in construction and arrangement of parts thereof may be resorted to without departing from the field and scope of the same, and I intend to include in this application all such variations as fall within the scope of the appended claims.

I claim:—

1. In a means for cleaning and degreasing articles, an apparatus comprising three compartments normally open for insertion and removal of the articles, a first for containing a cleaning emulsion, a second for containing a degreasing liquid solvent at a predetermined normal level therein and of greater specific gravity than the emulsion, and a third for containing a degreasing liquid solvent at a predetermined normal level therein, said third compartment having an overflow opening to said second compartment and the latter being closed to said first compartment, a still, a conduit opening into said second compartment at substantially the normal liquid level thereof and into said still at a lower level, a separator, a condenser connected to said still and discharging into said separator, a conduit discharging into said first compartment from the upper portion of said separator, and a conduit discharging into said third compartment from the lower portion of said separator.

2. In a means for cleaning and degreasing articles, an apparatus comprising three compartments normally open for insertion and removal of the articles, a first for containing a cleaning emulsion, a second for containing a degreasing liquid solvent at a predetermined normal level therein and of greater specific gravity than the emulsion, and a third for containing a degreasing liquid solvent at a predetermined normal level therein, said third compartment having an overflow opening to said second compartment and the latter being closed to said first compartment, a still, means for delivering solvent and emulsion mixed therewith from the upper portion of a body of liquid solvent in said second compartment to said still, a separator, a condenser connected to said still and discharging into said separator, means for delivering liquid solvent from the lower portion of said separator to said third compartment, and means for delivering separated emulsion from the upper portion of said separator to said first compartment.

HANNS HÖLLERER.